US009440133B2

(12) United States Patent
Davis et al.

(10) Patent No.: US 9,440,133 B2
(45) Date of Patent: Sep. 13, 2016

(54) MODULAR AIRBAG SYSTEM FOR PERSONAL PROTECTION

(71) Applicant: The North Face Apparel Corp., Wilmington, DE (US)

(72) Inventors: Jon Davis, San Francisco, CA (US); Ryan Lee, Berkeley, CA (US); Matthew Edward Paduano, Oakland, CA (US); Austin Robbs, Oakland, CA (US); Christopher Kenji Tagumi, Oakland, CA (US)

(73) Assignee: THE NORTH FACE APPAREL CORP., Wilmington, DE (US)

( * ) Notice: Subject to any disclaimer, the term of this patent is extended or adjusted under 35 U.S.C. 154(b) by 4 days.

(21) Appl. No.: 14/323,295

(22) Filed: Jul. 3, 2014

(65) Prior Publication Data

US 2016/0000158 A1 Jan. 7, 2016

(51) Int. Cl.

| | |
|---|---|
| ***B60R 21/16*** | (2006.01) |
| ***A63B 69/18*** | (2006.01) |
| *A62B 33/00* | (2006.01) |

(52) U.S. Cl.

CPC ................ *A63B 69/18* (2013.01); *A62B 33/00* (2013.01)

(58) Field of Classification Search

CPC ..... A62B 33/00; A62B 99/00; A63B 29/021

USPC ....... 280/728.1, 728.2, 743.1, 743.2; 441/80, 441/87, 92, 136

See application file for complete search history.

(56) References Cited

U.S. PATENT DOCUMENTS

| | | | | |
|---|---|---|---|---|
| 5,599,041 | A * | 2/1997 | Turnbull et al. | 280/729 |
| 6,158,380 | A * | 12/2000 | Aschauer et al. | 116/210 |
| 6,220,909 | B1 * | 4/2001 | Aschauer et al. | 441/80 |
| 6,270,386 | B1 | 8/2001 | Visocekas | |
| 7,270,077 | B2 * | 9/2007 | Beck | 116/210 |
| 2004/0244100 | A1 | 12/2004 | Haddacks | |
| 2006/0107952 | A1 * | 5/2006 | Schlosser | 128/202.19 |
| 2008/0041906 | A1 * | 2/2008 | Rose et al. | 224/628 |
| 2008/0257643 | A1 * | 10/2008 | Weinel et al. | 182/18 |
| 2009/0239428 | A1 * | 9/2009 | Berchten | 441/80 |
| 2010/0112880 | A1 * | 5/2010 | Aschauer | 441/80 |
| 2010/0184343 | A1 * | 7/2010 | Paynton et al. | 441/90 |
| 2010/0255809 | A1 * | 10/2010 | Aschauer et al. | 455/404.2 |
| 2012/0060267 | A1 | 3/2012 | Blenkarn et al. | |
| 2013/0019994 | A1 | 1/2013 | Schaer et al. | |
| 2013/0146175 | A1 * | 6/2013 | Walker et al. | 141/4 |
| 2013/0149924 | A1 * | 6/2013 | Grutta et al. | 441/80 |

* cited by examiner

*Primary Examiner* — Toan To

(74) *Attorney, Agent, or Firm* — Kenyon & Kenyon LLP

(57) ABSTRACT

A modular airbag system may include at least one inflatable airbag configured to deploy outward on a side(s) of the airbag system, for example, in two opposite substantially horizontal directions, at least one airbag compartment, and one or more straps configured to strap the modular airbag system securely to one of a user's body and/or an object, and configured to release the modular airbag system from one of the user's body and/or the object.

20 Claims, 6 Drawing Sheets

100

200

200

200

200

300

400

MODULAR AIRBAG SYSTEM FOR PERSONAL PROTECTION

BACKGROUND

The subject matter of this application is directed to a modular airbag system for personal protection, such as for increasing survival chances for skiers and snowboarders during an avalanche.

Personal airbag systems may deploy airbags near or next to a user's body, to provide buoyancy for the user in an avalanche, such that the user's body may be kept above the snow in an avalanche or near the top of the snow.

Personal airbag designs may traditionally be in the form of a single piece backpack. For instance, an exemplary personal airbag design is described in U.S. Patent Publication 2012/0060267 to Blenkarn et al., which is assigned on its face to Arc'Teryx Equipment Inc.

However, such airbags are very cumbersome and inflexible. For example, the user cannot strap on his/her own backpack while wearing the airbag backpack, because (1) strapping on two backpacks may be mechanically difficult or impossible to do and (2) strapping on a backpack on the airbag backpack may interfere with the normal function of the airbag, preventing the airbag from deploying the airbags properly.

Accordingly, there is a need for a modular airbag that can be used normally with a user's other equipment without sacrificing the airbag functions.

BRIEF DESCRIPTION OF THE DRAWINGS

So that features of the present invention can be understood, a number of drawings are described below, It is to be noted, however, that the appended drawings illustrate only particular embodiments of the disclosure and are therefore not to be considered limiting of its scope, for the invention may encompass other equally effective embodiments.

DETAILED DESCRIPTION

Embodiments of the present invention may provide for a modular airbag.

Figure 1:
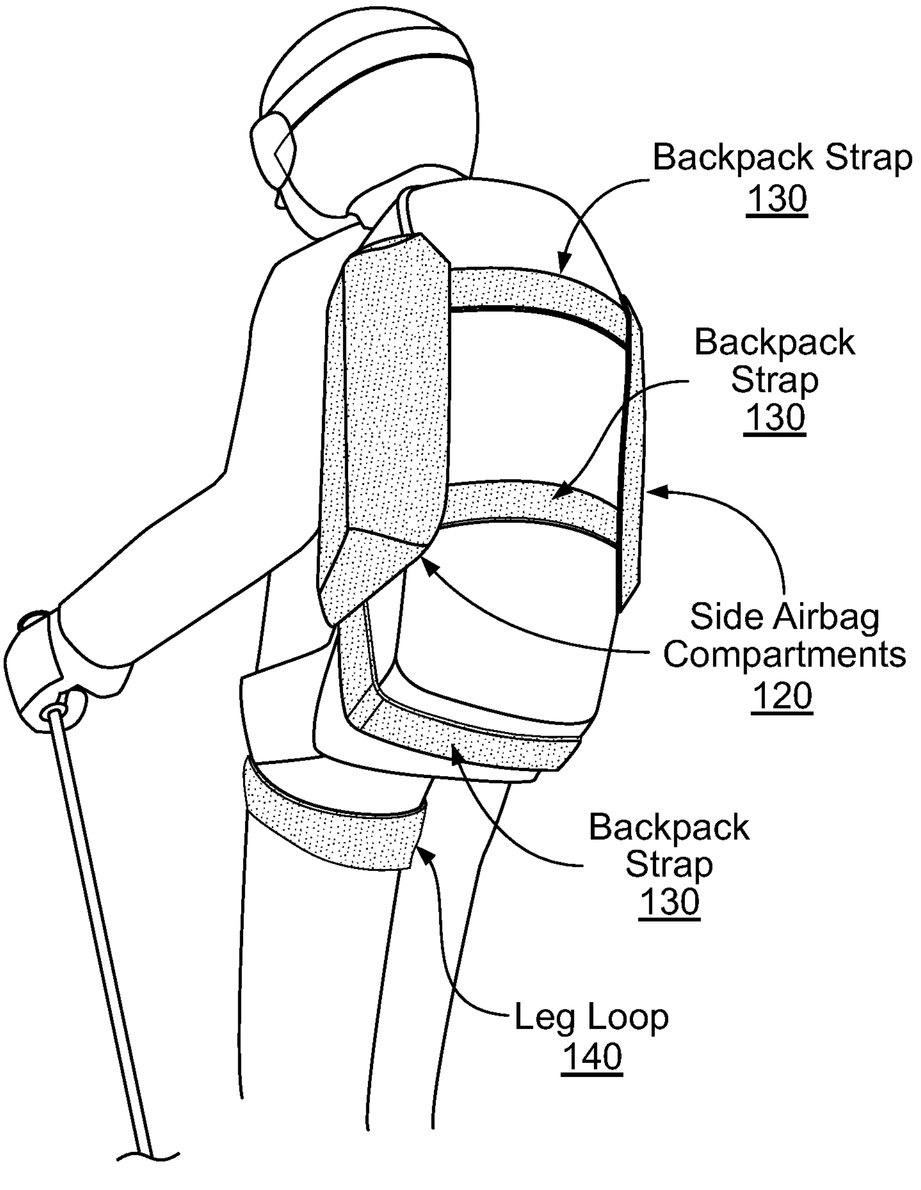
FIG. 1 illustrates an exemplary airbag according to an embodiment of the present invention.

In one embodiment as illustrated in FIG. 1, a modular airbag 100 may include two side airbag compartments 120 with a plurality of backpack straps 130. The backpack straps 130 may be configured to allow the side airbag compartments 120 to be securely attached to a backpack and may be configured to allow the side airbag compartments 120 to be released or detached from the backpack. The side airbag compartments 120 may be configured to be attached on the two sides of the backpack.

The side airbag compartments 120 may each contain one or more deflated airbags (not shown). The modular airbag 100 may contain one or more gas canisters (not shown) for inflating and deploying the airbags, in one or both of the side airbag compartments 120. The gas canisters may contain pressurized air or other gases, or may include chemicals that react upon trigger to produce gases, or may include mechanisms that pump gas into the airbags. The modular airbag 100 may further include a trigger for triggering the deployment of the airbags. The trigger may be manual and/or automatic, mechanical, chemical, and/or electrical.

The backpack straps 130 may be configurable in lengths, such that the modular airbag 100 can accommodate various different size backpacks, or even use without a backpack for the user.

In this configuration, the modular airbag 100 may be attached to a backpack, and the user may strap on the backpack as he/she would do normally. The modular airbag 100 may deploy the airbags on either side of the backpack, without interference from the backpack.

The modular airbag 100 may include one or more straps for attaching the modular airbag 100 to the user's body, for example, here a leg loop 140 is used to attach the lower portion of the modular airbag 100 to the user's leg. This allows the modular airbag 100 to be attached to the user's body, even if the backpack itself became detached from the user.

The modular airbag 100 may include additional straps to attach to the user's body, for example waist straps and/or shoulder straps (not shown).

Figure 2A:
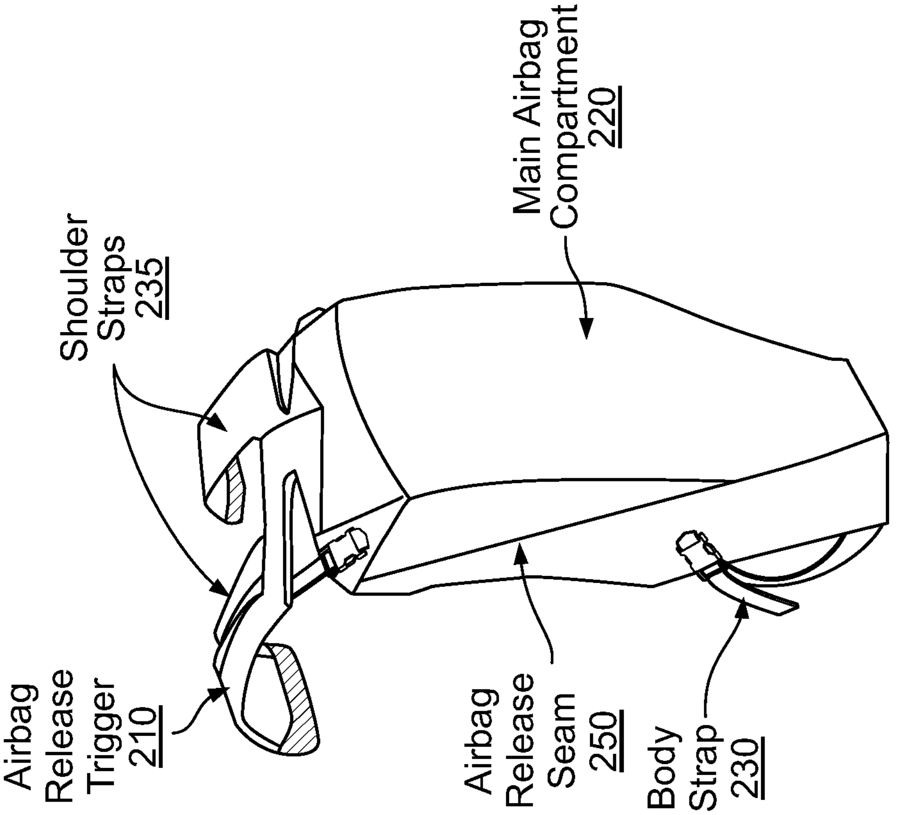
FIGS. 2A and 2B illustrate an exemplary airbag according to an embodiment of the present invention.
Figure 2B:
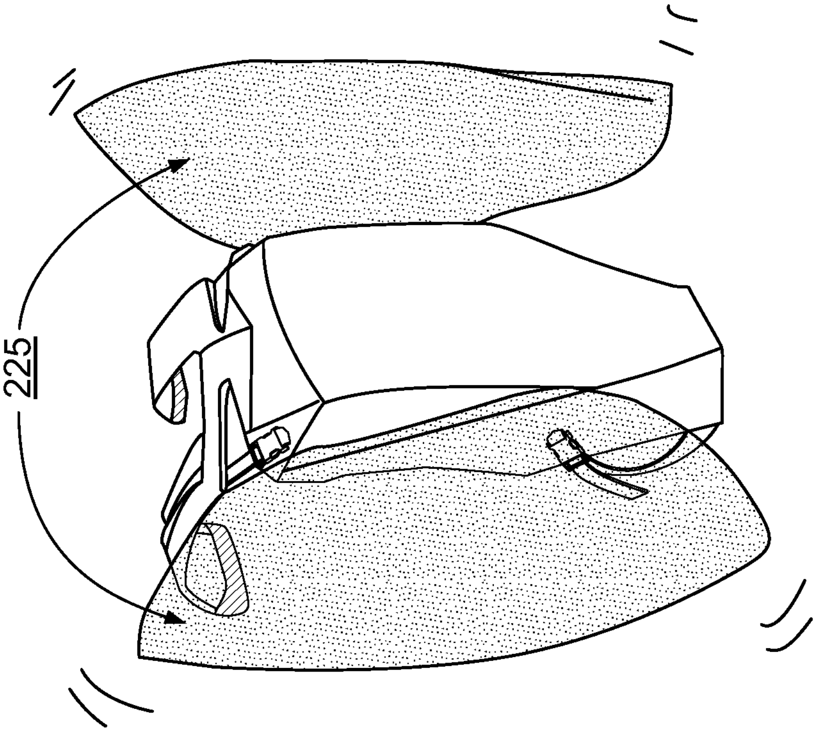

FIGS. 2A and 2B illustrate an exemplary airbag according to an embodiment of the present invention.

FIG. 2A illustrates an exemplary airbag 200 according to an embodiment. The modular airbag 200 may include a single main airbag compartment 220 and one or more body straps 230, for attaching the modular airbag 200 to the user's body. Here, body strap 230 is shown as a waist strap. There may also be shoulder straps 235 and chest straps (not shown).

For this configuration, the user may strap the modular airbag 200 onto his/her body, such that the main airbag compartment 220 is draped on his/her back. And then optionally, a backpack may be draped directly over the main airbag compartment 220 of the modular airbag 200. In this configuration, the main airbag compartment 220 may need to include a hardened frame to prevent the main airbag compartment 220 from collapsing under the weight of a backpack, which may interfere with the normal deployment of the side airbags 225 shown in FIG. 2B.

The modular airbag 200 may include airbag release trigger 210. The airbag release trigger 210 may be located on a shoulder strap 235, such that a user may conveniently reach it to trigger the airbag deployment.

The main airbag compartment 220 may have airbag release seams 250 on either side, such that when the side airbags 225 are released as shown in FIG. 2B, the side airbags emerge and deploy from the opening created along the airbag release seams 250. The shapes of the side airbags 225 are not necessarily limited to any specific shape. However, some shapes of the side airbags 225 may be more optimal for deployment and/or buoyancy.

Figure 3:
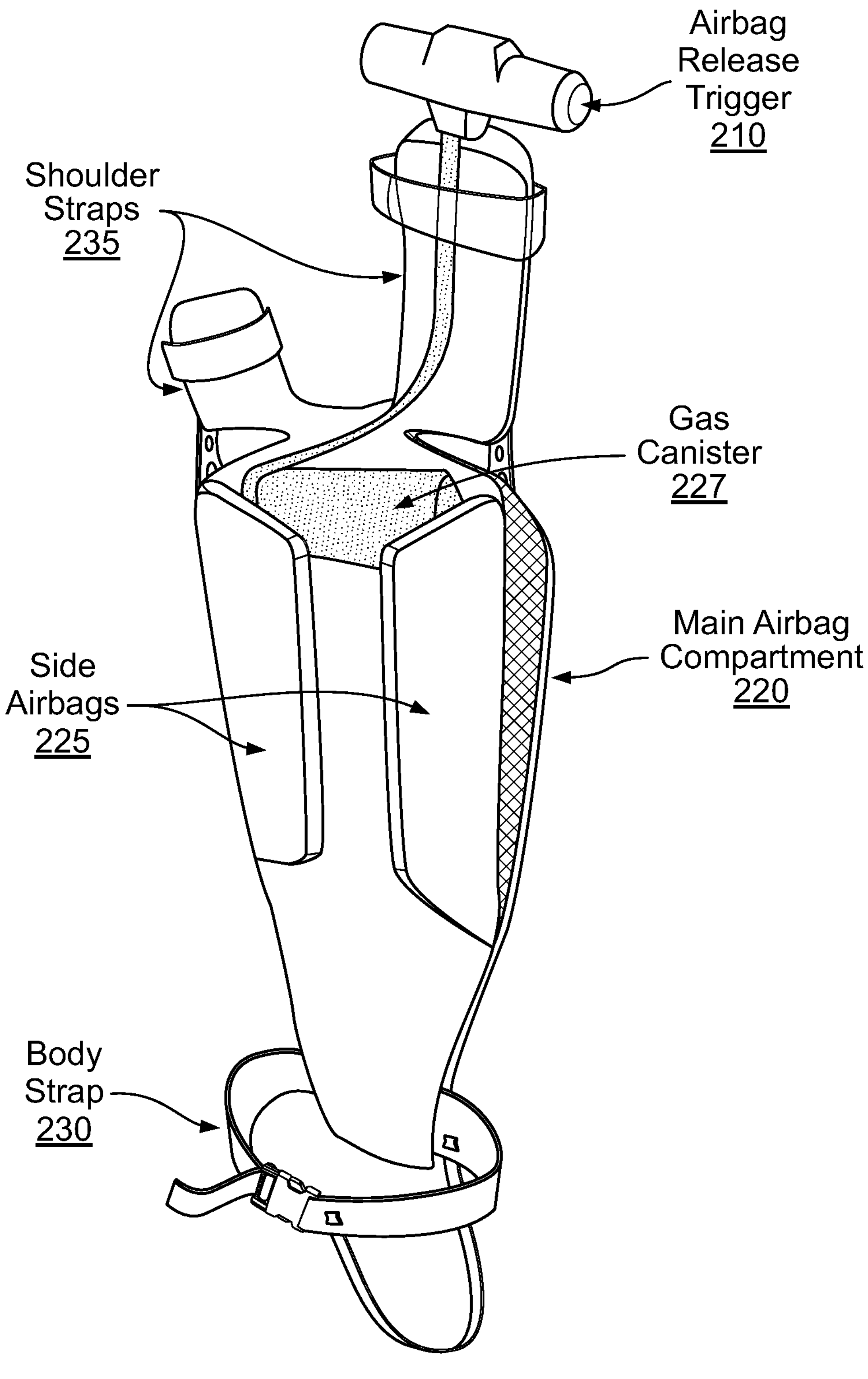
FIG. 3 illustrates an exemplary airbag according to an embodiment of the present invention.

FIG. 3 illustrates a see-through view of the exemplary modular airbag 200 according to an embodiment of the present invention.

As illustrated in FIG. 3, the modular airbag 200 may contain (within the main airbag compartment 220) a gas canister 227, which can be triggered the airbag release trigger 210. Shoulder straps 235 may be draped over the user's shoulders. Shoulder straps 235 may include additional straps to attach the shoulder straps 235 to the shoulder straps of a backpack. Body straps 230 may further securely attach the modular airbag 200 to the user's body. The main airbag compartment 220 may include two or more side airbags, configured to deploy outward on the either sides of the main airbag compartment 220, in the two opposite horizontal directions.

Figure 4:
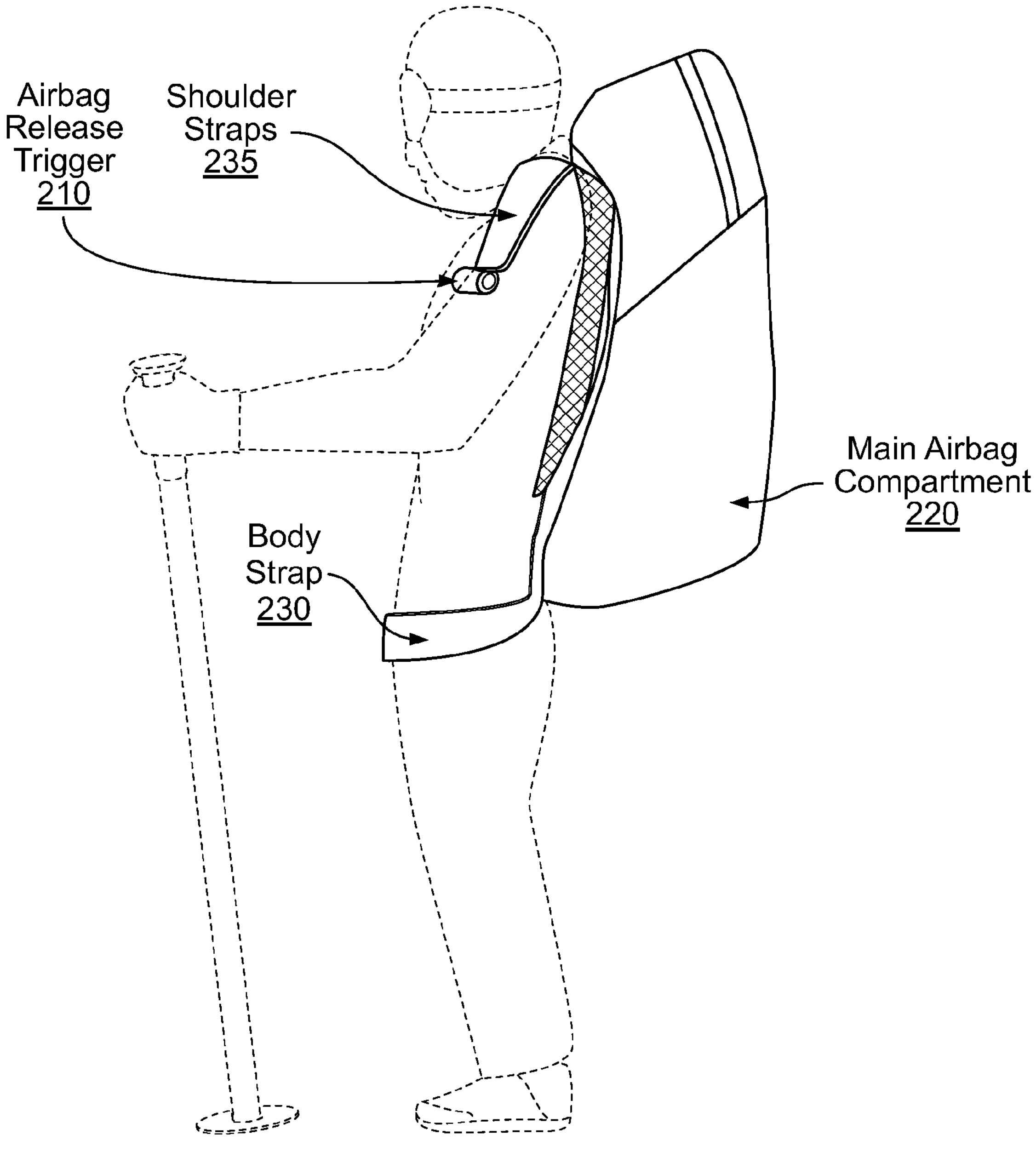
FIG. 4 illustrates an exemplary airbag according to an embodiment of the present invention.

FIG. 4 illustrates a side view of an user fitted with an exemplary modular airbag 200 and a backpack, according to an embodiment of the present invention.

For this configuration, the user may strap the modular airbag 200 onto his/her body, such that the main airbag compartment 220 is draped on his/her back. And then optionally, a backpack may be draped directly over the main airbag compartment 220 of the modular airbag 200.

Figure 5:
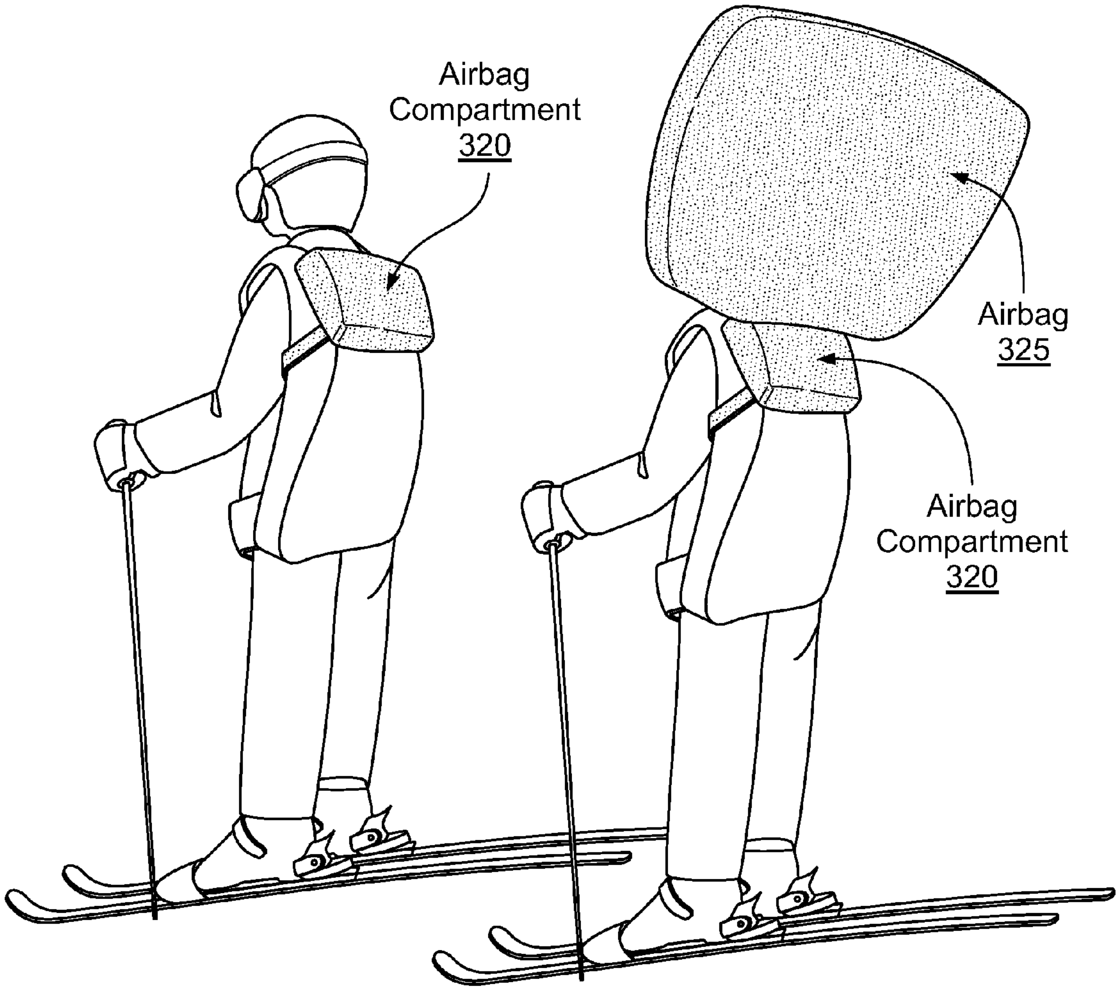
FIG. 5 illustrates an exemplary airbag according to an embodiment of the present invention.

FIG. 5 illustrates a side view of an user fitted with an exemplary modular airbag 300 and a backpack, according to an embodiment of the present invention.

A modular airbag system 300 may include an airbag compartment, and at least one inflatable airbag 325 housed within the airbag compartment 320.

The inflatable airbag 325 may be configured to deploy (e.g., upward from a top side and/or outward from a vertical side) from a side of the airbag compartment 320. One or more straps may be connected to the airbag compartment 320 and configured to strap the airbag compartment 320 securely to an object (for example a backpack) on an outer surface of the object, and configured to release the airbag compartment 320 from the object.

Figure 6:
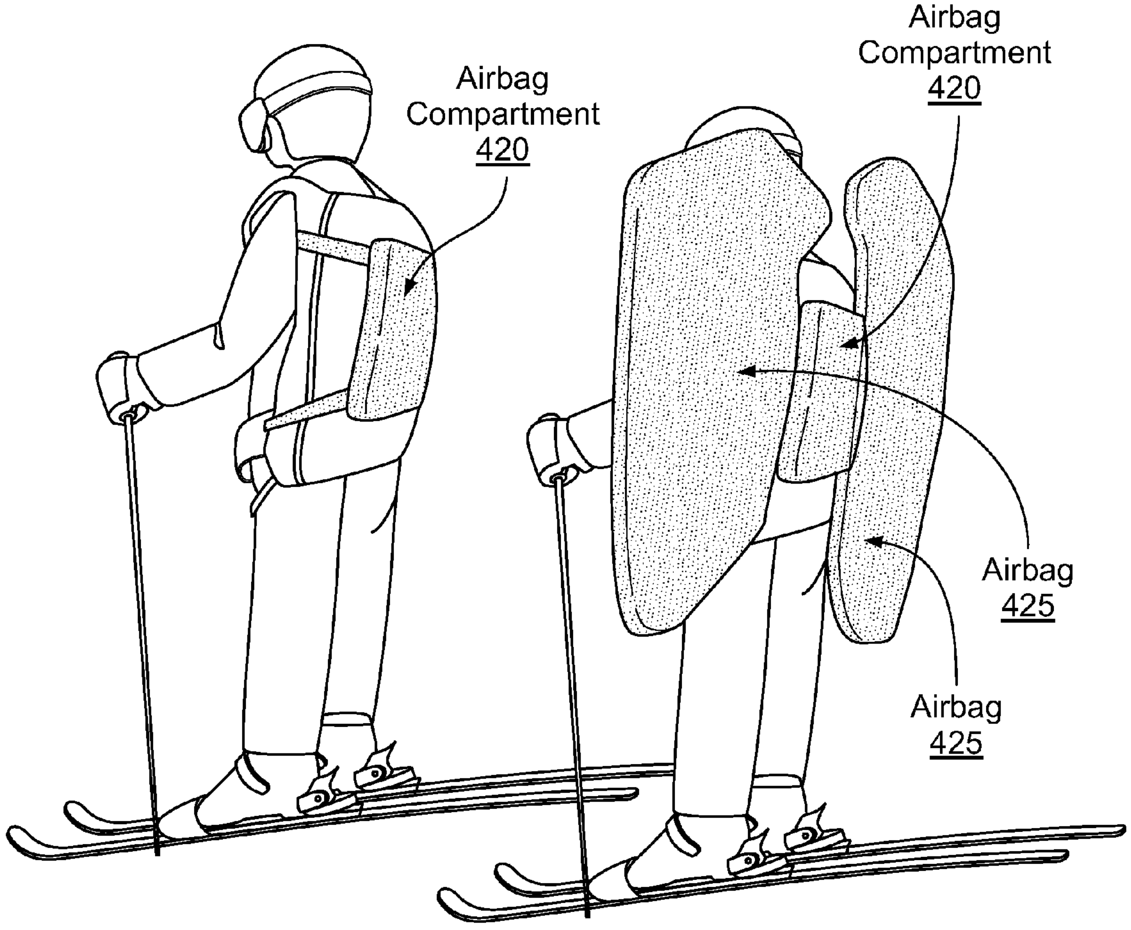
FIG. 6 illustrates an exemplary airbag according to an embodiment of the present invention.

FIG. 6 illustrates a side view of a user fitted with an exemplary modular airbag 400 and a backpack, according to an embodiment of the present invention.

A modular airbag system 400 may include an airbag compartment, and at least two inflatable airbags 425 housed within the airbag compartment 420.

The inflatable airbags 425 may be configured to deploy outward on either side of the airbag compartment 420, in two opposite horizontal directions. One or more straps may be connected to the airbag compartment 420 and configured to strap the airbag compartment 420 securely to an object (for example a backpack) on an outer surface of the object, and configured to release the airbag compartment 420 from the object.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. Those skilled in the art will appreciate that the invention may be implemented in other ways without departing from the spirit and substantive features of the invention. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A modular airbag system, comprising:

at least two airbag compartments;

at least two inflatable airbags housed in the at least two airbag compartments, the at least two inflatable airbags configured to deploy outward on two sides of the airbag system in two opposite substantially horizontal directions; and one or more straps connected to at least one of the at least two airbag compartments, the one or more straps configured to strap the at least two airbag compartments securely to an object, and configured to release the at least two airbag compartments from the object, wherein the object can be worn by a user.

2. The modular airbag system of claim 1, further comprising a gas canister configured to inflate the inflatable airbags if triggered, wherein the gas canister comprises pressurized gases, a chemical reactant for producing gas, or a mechanism configured to pump gas.

3. The modular airbag system of claim 1, wherein the object is a backpack.

4. The modular airbag system of claim 1, further comprising a trigger configured to trigger inflation and deployment of the airbags, wherein the trigger comprises chemical, mechanical, or electrical mechanisms.

5. The modular airbag system of claim 4, wherein the trigger triggers automatically based upon sensor data.

6. The modular airbag system of claim 4, wherein the trigger triggers manually based upon the user's control.

7. The modular airbag system of claim 1, wherein the at least one or more straps are directly connected to the at least one of the at least two airbag compartments.

8. The modular airbag system of claim 1, further comprising one or more waist straps or one or more chest straps.

9. The modular airbag system of claim 1, further comprising a leg strap for attaching to the user's leg.

10. A method for attaching a modular airbag system to an object, comprising:

providing a modular airbag system, comprising:

at least two airbag compartments;

at least two inflatable airbags housed in the at least two airbag compartments, the at least two inflatable airbags configured to deploy outward on two sides of the airbag system in two opposite substantially horizontal directions; and one or more straps connected to at least one of the at least two airbag compartments, attaching the modular airbag system to an object with the one or more straps, wherein the object can be worn by a user.

11. The method of claim 10, wherein the object is a backpack.

12. The method of claim 10, wherein the one or more straps are directly connected to the at least one of the at least two airbag compartments.

13. A modular airbag system, comprising:

an airbag compartment formed of a hardened external shell configured to prevent collapse of the airbag compartment;

at least one inflatable airbag housed within the airbag compartment and configured to deploy outward on two lateral sides of the airbag compartment in two opposite substantially horizontal directions; and one or more straps connected to the hardened external shell and configured to strap the airbag compartment securely to a user's body, and configured to release the airbag compartment from the user's body, wherein the airbag compartment is configured to be attached to the user's body without a backpack.

14. The modular airbag system of claim 13, further comprising a gas canister configured to inflate the inflatable airbags if triggered, wherein the gas canister comprises pressurized gases, chemical reactant for producing gas, or mechanism configured to pump gas.

15. The modular airbag system of claim 13, wherein the at least one inflatable airbag is at least two inflatable airbags configured to deploy outward on the two sides of the airbag system in the two opposite substantially horizontal directions.

16. The modular airbag system of claim 13, further comprising a trigger configured to trigger inflation and deployment of the airbags.

17. The modular airbag system of claim 13, further comprising one or more waist straps or one or more chest straps.

18. The modular airbag system of claim 13, further comprising a leg strap for attaching to a user's leg.

19. The modular airbag system of claim 13, wherein the two airbag compartments share a single gas canister.

20. A modular airbag system, comprising:

an airbag compartment;

at least one inflatable airbag housed within the airbag compartment and configured to deploy from at least one side of the airbag compartment; and one or more straps connected to the airbag compartment and configured to strap the airbag compartment securely to an object, and configured to release the airbag compartment from the object, wherein the object can be worn by a user.

* * * * *